March 13, 1934.  I. B. LEVINE  1,951,026
POLYPHASE TRANSMISSION
Filed Dec. 21, 1931  3 Sheets-Sheet 1
FIG_1
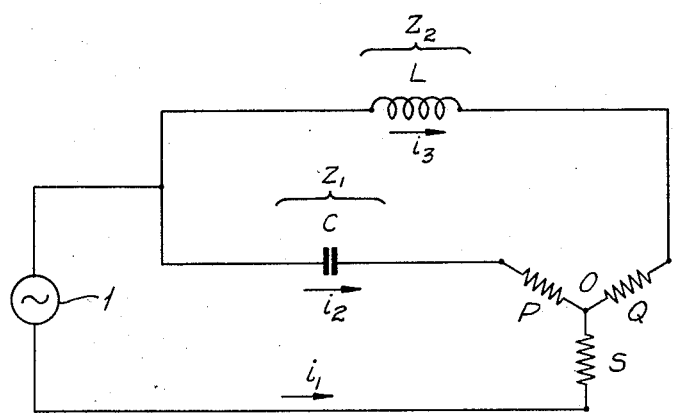
FIG_2
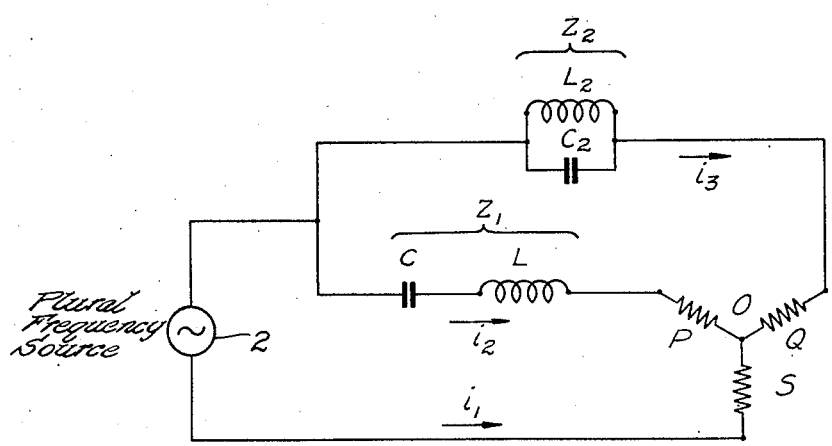
INVENTOR
Irwin B. Levine
BY
*Wm. J. Herdman*
ATTORNEY

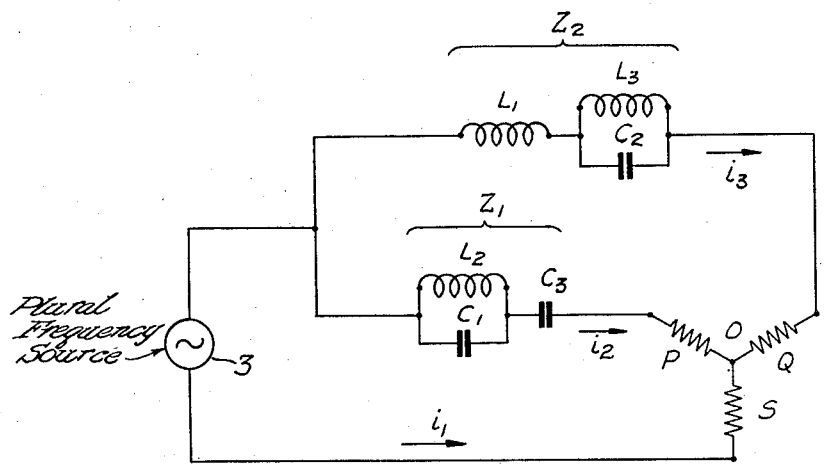
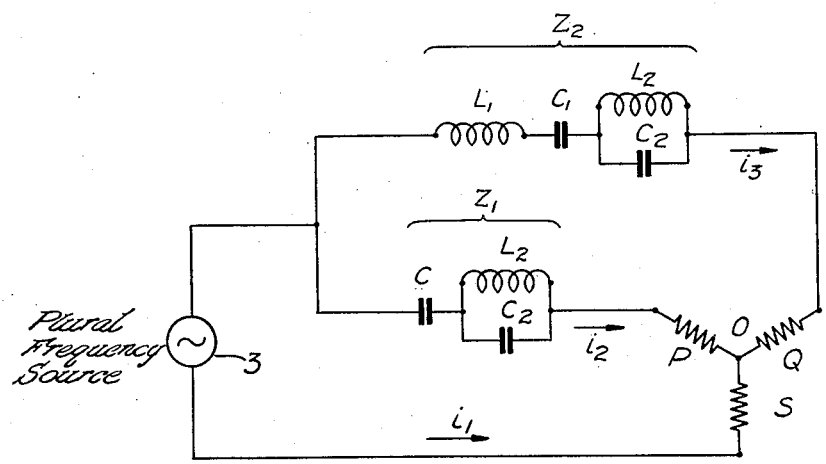

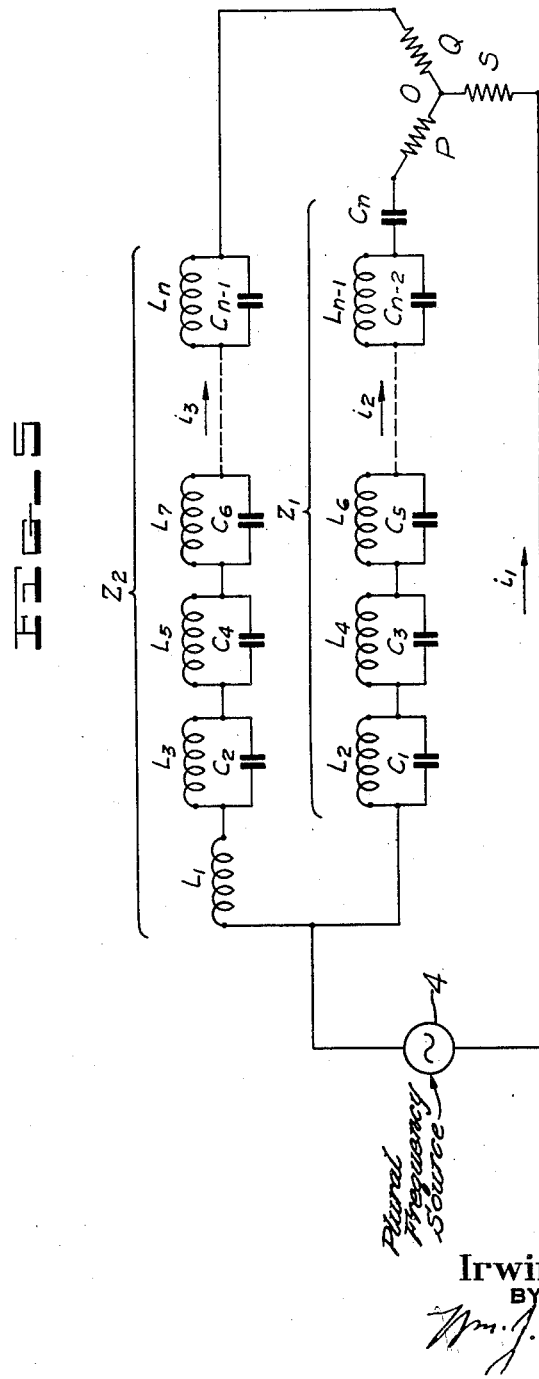

Patented Mar. 13, 1934

1,951,026

UNITED STATES PATENT OFFICE 1,951,026

POLYPHASE TRANSMISSION

Irwin B. Levine, Newark, N. J., assignor to Wired Radio, Inc., New York, N. Y., a corporation of Delaware Application December 21, 1931, Serial No. 582,260

4 Claims. (Cl. 172—238)

My invention pertains in general to transmission networks and specifically relates to a system for the transmission of polyphase alternating currents.

One of the objects of my invention consists in providing means for polyphase transmission of alternating currents at more than one frequency.

Another object consists in producing means for polyphase transmission at several carrier frequencies with minimum phase unbalance at other frequencies which may be transmitted, such as the modulation side band frequencies.

These and other objects will be apparent from the following taken in conjunction with the accompanying drawings in which:

Fig. 1 is a diagrammatic representation of a circuit for transmission of power at a single frequency from a single-phase source to a three-phase load;

Fig. 2 is a diagrammatic representation of a circuit for transmission of power of two frequencies.

Fig. 3 illustrates a circuit for transmission of power of three frequencies;

Fig. 4 represents a modification of the circuit of Fig. 3; and

Fig. 5 is a representation of a circuit for transmission of power of $n$ frequencies to a three-phase load.

In the transmission of power it very often occurs that the load is a balanced or unbalanced three-phase impedance as distinguished from the usual two-terminal impedance. Such a condition is particularly true in wired radio broadcasting where high frequency signals are transmitted over commercial power distribution networks. In such a wired radio broadcasting system it is found that the power distribution networks include Y-connected or $\Delta$-connected three-phase loads at the sub-station. It is known that to economically transmit signalling energy over three-phase lines it is desirable that the signalling energy generating apparatus should supply a three-phase current to the load. The current entering any terminal of the load would then be equal to the current entering any other terminal and would be leading or lagging by 120 electrical degrees as expressed as follows:

$$I_3 = I_1 < -120° = I_1 < 240° \quad (1)$$
$$I_2 = I_1 < +120° \quad (2)$$

where $I_1$, $I_2$, $I_3$ are the three currents entering the three terminals of the load.

In order to transmit such three-phase signalling energy it is possible to provide a three-phase signalling energy generating apparatus having three output terminals, or means can be provided, as in accordance with my invention, for conversion of single-phase current into three-phase current.

To convert a single-phase current into a three-phase current, consider the circuit of Fig. 1 having an energy source 1 for supplying single-phase single frequency alternating current. The current from the source 1 is supplied to two branches containing impedances $Z_2$ and $Z_1$ connected to the arms Q and P of a Y-connected load also including the arm S, all arms of which are interconnected at the point O. The impedances $Z_1$ and $Z_2$ comprise the capacitance C and inductance L, respectively. In each branch, the reactive impedance produces phase displacement of the current.

By Kirchoff's law, integrating the potential around the closed loop POQ $$I_3(jZ_2+R)-I_2(jZ_1+R)=0 \quad (3)$$

where $$I_3=I_1<+120°=I_1\left(-\frac{1}{2}+j\frac{\sqrt{3}}{2}\right) \quad (4)$$

$$I_2=I_1<-120°=I_1\left(-\frac{1}{2}-j\frac{\sqrt{3}}{2}\right) \quad (5)$$

in which R is the value of the resistance of each arm of the Y-connected load PQS and $Z_1$ and $Z_2$ are the two added reactances.

Equation (3) can be written $$I_3(R+jZ_2)=I_2(R+jZ_1) \quad (6)$$

or $$I_1\left(-\frac{1}{2}+j\frac{\sqrt{3}}{2}\right)(R+jZ_2)=$$
$$I_1\left(-\frac{1}{2}-j\frac{\sqrt{3}}{2}\right)(R+jZ_1) \quad (7)$$

which may be reduced to:

$$+j\left(R\frac{\sqrt{3}}{2}-\frac{Z_2}{2}\right)-\frac{R}{2}-Z_2\frac{\sqrt{3}}{2}=$$
$$-j\left(\frac{R\sqrt{3}}{2}+\frac{Z_1}{2}\right)-\frac{R}{2}+\frac{Z_1\sqrt{3}}{2} \quad (8)$$

to eliminate all reactive power $$\frac{R\sqrt{3}}{2}-\frac{Z_2}{2}=0 \text{ or } Z_2=R\sqrt{3} \quad (9)$$

$$\frac{R\sqrt{3}}{2}+\frac{Z_1}{2}=0 \text{ or } Z_1=-R\sqrt{3} \quad (10)$$

in which (9) and (10) satisfy the requirements of Equation (8).

Fig. 2 illustrates a network in accordance with my invention for transmitting single phase signaling energy of two carrier frequencies to a three phase load PQS. The source 2 supplies signaling energy at two discrete carrier frequencies. For three-phase conversion, the reactances $Z_1$, $Z_2$ are of the form shown in which $Z_1$ is a series resonant circuit including the inductance L and capacitance C and which may have a value of $-R\sqrt{3}$ reactance at the lower frequency of signaling energy to be transmitted and $+R\sqrt{3}$ reactance at the higher frequency. In this circuit, $Z_2$ now comprises a parallel resonant circuit which may have $+R\sqrt{3}$ reactance at the lower frequency and $-R\sqrt{3}$ reactance at the higher frequency. The circuit of Fig. 2 shows the simplest form which $Z_1$ and $Z_2$ may assume but there is no limitation to the number of elements over two that they may contain.

When $Z_1$ and $Z_2$ are of the simplest form it can be shown that $$LC = \frac{1}{W_1 W_2}$$

where L, C represent the inductance and the capacitance of circuits $Z_1$ and $Z_2$ and $W_1$, $W_2$ equal $2\pi$ times the lower and upper frequency of the transmitted signaling energy.

In $Z_1$ $$L = R\sqrt{3} \frac{1}{W_2 - W_1}$$

$$C = \frac{1}{R\sqrt{3}} \frac{W_2 - W_1}{W_1 W_2}$$

In $Z_2$ $$L = R\sqrt{3} \frac{W_2 - W_1}{W_1 W_2}$$

$$C = \frac{1}{R\sqrt{3}} \frac{1}{W_2 - W_1}$$

Reference will now be had to Fig. 3 which is a circuit, in accordance with my invention, for transmitting single-phase signalling energy of three discrete frequencies to a three-phase load. Referring to Fig. 3 there is provided an energy source 3 which supplies single-phase signalling energy at three discrete carrier frequencies. In the circuit of Fig. 3 the impedance $Z_1$ comprises a circuit branch connected with the arm P of the three-phase load and includes a parallel resonant circuit $L_2$ and $C_1$ connected in series with capacitance $C_3$. The impedance $Z_2$ comprises a circuit branch connected with the arm Q of the three-phase load and includes a parallel resonant circuit having the inductance $L_3$ and capacitance $C_2$ connected in series with inductance $L_1$. The relationship of the parameters of the circuit of Fig. 3 will be apparent from the following.

For the circuit branch comprising the impedance $Z_1$:

$$\frac{1}{L_2 C_1} = a^2$$

$$\frac{C_1}{C_3} = \frac{b}{c}$$

$$L_2 = R\sqrt{3} \frac{c}{a^2}$$

$$C_3 = \frac{1}{R\sqrt{3}} \frac{a^2}{b}$$

$$C_1 = \frac{1}{R\sqrt{3}} \frac{a^2}{c}$$

Where $a^2 = W_1 W_2 + W_1 W_3 - W_2 W_3$, $b = W_1 W_2 W_3$, and $c = (W_2 - W_1)(W_3 + W_2)(W_3 - W_1)$, and $W_1$, $W_2$, $W_3$ are $2\pi$ times the frequencies at which three-phase balance is maintained.

For the circuit branch comprising the impedance $Z_2$:

$$\frac{1}{L_3 C_2} = \frac{a}{b}$$

$$\frac{L_1}{L_3} = \frac{a}{c}$$

$$L_3 = R\sqrt{3} \frac{c}{ab}$$

$$C_2 = \frac{1}{R\sqrt{3}} \frac{b^2}{c}$$

$$L_1 = R\sqrt{3} \frac{1}{b}$$

Where $a = W_1 W_2 W_3$ $b = W_1 - W_2 + W_3$ $c = (W_1 - W_2)(W_2 - W_3)(W_1 + W_3)$.

It will be apparent that the current $I_2$ will lag behind $I_1$ at $W_1$, lead at $W_2$, and lag again at $W_3$.

It will of course be understood that the circuit of Fig. 3 is in its simplest form and that equivalent forms of the same circuit may be substituted if desired. For example, the system of my invention may be modified by adding elements to bring about circuit conditions for accentuating the transmission of signaling energy at predetermined portions of the transmitted frequency ranges. Fig. 4 represents such a modification in which the capacitance $C_4$ added in the impedance branch $Z_2$ for accentuating transmission in the range between $W_1$ and $W_2$. The circuit of Fig. 4 otherwise is identical with the circuit of Fig. 3.

Consideration will now be given to a system in accordance with my invention for the transmission of single-phase alternating currents of $n$ frequencies to a three-phase load. An energy source 4 supplies single-phase signaling energy of $n$ carrier frequencies for transmission to the three-phase load PQS. The reactive impedance $Z_2$ comprises inductance $L_1$ in series with parallel resonant circuit including capacitance $C_2$ and inductance $L_3$ up to and including the capacitance $C_{n-1}$ and inductance $L_n$. The reactive impedance branch $Z_1$ includes the parallel resonant circuits including the capacitance $C_1$ and inductance $L_2$ up to and including the parallel resonant circuit comprising capacitance $C_{n-2}$ and inductance $L_{m-1}$ in series with the capacitance $C_n$. For transmission of single-phase signaling energy of $n$ frequencies to a three-phase load it will be apparent that, in accordance with my invention, each of the reactive impedance circuit branches includes $n$ reactance elements. It will of course be understood that equivalent networks can be substituted for the reactance elements and that additional elements may be provided if desired.

It will now be apparent that I have provided a novel system for the transmission of single-phase multi-frequency signaling energy to a three-phase load. Although I have shown preferred arrangements of my system it will of course be understood that many modifications will occur to those skilled in the art but which will not depart from the intended scope of my invention I do not therefore desire to limit myself to the foregoing except insofar as may be pointed out in the appended claims.

What I claim as new and original and desire to secure by Letters Patent of the United States is:

1. In a system for producing polyphase carrier frequency current from single phase carrier frequency currents, a source of single phase current at a plurality of discrete carrier frequencies, a polyphase work circuit, and a phase conversion network interconnecting said source of carrier frequency currents and said load circuit, said network being commonly traversed by by said discrete carrier frequency currents and including a plurality of impedance branches for effecting the phase conversion of all of said carrier frequency currents, one of said impedance branches having a negative reactance at one of said carrier frequencies and a positive reactance at a higher one of said carrier frequencies, and another of said impedance branches having a positive reactance at said first mentioned carrier frequency and a negative reactive at said higher carrier frequency.

2. In a system for producing polyphase carrier frequency current from single phase carrier frequency currents, a source of single phase current at a plurality of discrete carrier frequencies, a three phase balanced work circuit, and a phase conversion network interconnecting said source of carrier frequency currents aid said load circuit, said network being commonly traversed by said discrete carrier frequency currents and including a plurality of impedance branches for effecting phase conversion of said carrier frequency currents, one of said impedance branches having substantially $$-R\sqrt{3}$$

reactance at one of said carrier frequencies and $$+R\sqrt{3}$$

reactance at a higher one of said carrier frequencies, and another of said impedance branches having $$+R\sqrt{3}$$

reactance at said first mentioned carrier frequency and $$-R\sqrt{3}$$

reactance at said higher carrier frequency.

3. In a system for producing polyphase carrier frequency current from single phase carrier frequency current, a source of single phase currents at $n$ discrete carrier frequencies, $n$ being greater than unity, a polyphase work circuit, and a phase conversion network interconnecting said source of carrier frequency currents and said load circuit, said network being commonly traversed by said discrete carrier frequency currents and including a plurality of impedance branches for effecting the phase conversion of said carrier frequency currents, each of said impedance branches comprising at least $n$ reactive elements for effecting phase conversion, one of said impedance branches having a negative reactance at one of said carrier frequencies and a positive reactance at a higher one of said carrier frequencies, and another of said impedance branches having a positive reactance at said first mentioned carrier frequency and a negative reactance at said higher carrier frequency.

4. A system in accordance with claim 3 in which said reactive elements are connected to include a series of closed circuits including inductance and capacitance in each of said impedance branches.

IRWIN B. LEVINE.